US012655954B2

(12) United States Patent
Yamamoto

(10) Patent No.: US 12,655,954 B2
(45) Date of Patent: Jun. 16, 2026

(54) VEHICLE LAMP

(71) Applicant: STANLEY ELECTRIC CO., LTD., Tokyo (JP)

(72) Inventor: Takuya Yamamoto, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

(21) Appl. No.: 19/065,836

(22) Filed: Feb. 27, 2025

(65) Prior Publication Data

US 2025/0277569 A1 Sep. 4, 2025

(30) Foreign Application Priority Data

Mar. 1, 2024 (JP) ................................ 2024-031314

(51) Int. Cl.

*F21S 41/24* (2018.01)
*F21S 41/148* (2018.01)
*F21S 41/43* (2018.01)

(52) U.S. Cl.

CPC ............ *F21S 41/24* (2018.01); *F21S 41/148* (2018.01); *F21S 41/43* (2018.01)

(58) Field of Classification Search

CPC ...... F21S 43/251; F21S 43/252; F21S 43/253; F21S 41/24; F21S 41/148; F21S 41/43; B60Q 1/28

See application file for complete search history.

(56) References Cited

U.S. PATENT DOCUMENTS

| | | | | |
|---|---|---|---|---|
| 9,677,735 B2 * | 6/2017 | Hardy | F21S 43/33 |
| 10,371,342 B2 * | 8/2019 | Gloss | F21S 43/237 |
| 11,703,201 B2 * | 7/2023 | Kikuchi | F21S 41/24 362/618 |
| 12,196,384 B2 * | 1/2025 | Rother | B60R 19/52 |

FOREIGN PATENT DOCUMENTS

JP 2018-198154 A 12/2018

* cited by examiner

*Primary Examiner* — Matthew J. Peerce
(74) *Attorney, Agent, or Firm* — Kenealy Vaidya LLP

(57) ABSTRACT

Provided is a vehicle lamp having a lighting unit disposed inside a lighting body constituted by a housing and an outer lens, the lighting unit includes a light source and a light guide body, some of light guided by the light guide body is emitted toward a front side of the outer lens to cause a first emission region to emit light, and some of the light guided by the light guide body is emitted toward an outer circumferential edge portion of the outer lens to cause a second emission region to emit light.

5 Claims, 5 Drawing Sheets

VEHICLE LAMP

CROSS-REFERENCE TO RELATED APPLICATION

Priority is claimed to Japanese Patent Application No. 2024-031314, filed Mar. 1, 2024, the content of which is incorporated herein by reference.

BACKGROUND OF THE INVENTION

Field of the Invention

The present invention relates to a vehicle lamp.

Description of Related Art

For example, a vehicle lamp mounted on a vehicle has a configuration in which a lighting unit is disposed inside a lighting body constituted by a housing with a front surface open, and an outer lens configured to cover the opening of the housing, and light radiated by the lighting unit is emitted from a front side of the outer lens.

Meanwhile, Japanese Unexamined Patent Application, First Publication No. 2018-198154 discloses a configuration in which sufficient light is emitted from an end portion of an outer lens in which the outer lens is used as a light guide body configured to guide light emitted from a light source (for example, see Japanese Unexamined Patent Application, First Publication No. 2018-198154).

SUMMARY OF THE INVENTION

Incidentally, in the invention disclosed in Japanese Unexamined Patent Application, First Publication No. 2018-198154 described above, the aim is to make emission regions of two adjacent vehicle lamps appear to be emitting light as a single unit by illuminating the entire outer lens, including the end portions.

Accordingly, in the invention disclosed in Japanese Unexamined Patent Application, First Publication No. 2018-198154, since the configuration is emitting light with the entire outer lens including the end portions, it is not configured so that each of the emission regions located at different positions on the front side and the outer circumferential edge portion of the outer lens are illuminated using a single lighting unit arranged within the lighting body.

An aspect of the present invention is directed to providing a vehicle lamp capable of causing each of emission regions located at different positions on a front side and an outer circumferential edge portion of an outer lens to emit light using a single lighting unit disposed in a lighting body.

An aspect of the present invention provides the following configurations.

(1) A vehicle lamp having a lighting unit disposed inside a lighting body constituted by a housing having an opening in a front surface of the housing, and an outer lens configured to cover the opening of the housing, the vehicle lamp including:

a first emission region that emits light by emitting some of light radiated by the lighting unit from a front side of the outer lens, and a second emission region that emits light by emitting some of the light radiated by the lighting unit from an outer circumferential edge portion of the outer lens, wherein the lighting unit includes a light source, and a light guide body configured to guide the light emitted from the light source, some of the light guided by the light guide body is emitted toward the front side of the outer lens to cause the first emission region to emit light, and some of the light guided by the light guide body is emitted toward the outer circumferential edge portion of the outer lens to cause the second emission region to emit light.

(2) The vehicle lamp according to the above-mentioned (1), wherein the light guide body has:

an incidence part that is located on a side facing the light source and into which the light emitted from the light source enters;

a first emission part that is located on a side facing the front side of the outer lens and that is configured to emit the light toward the front side of the outer lens; and a second emission part that is located on a side facing an outer circumferential edge portion of the outer lens and that is configured to emit the light toward the outer circumferential edge portion of the outer lens.

(3) The vehicle lamp according to the above-mentioned (2), wherein the outer lens has:

a first lens incidence surface that is located on a side facing the first emission part and into which the light emitted from the first emission part enters;

a first lens emission surface that is located on a side opposite to the first lens incidence surface and that is configured to emit the light entering from the first lens incidence surface;

a second lens incidence surface that is located on a side opposite to the second emission part and into which the light emitted from the second emission part enters; and a second lens emission surface that is located on a side opposite to the second lens incidence surface and that is configured to emit the light entering from the second lens incidence surface.

(4) The vehicle lamp according to the above-mentioned (3), wherein the outer lens has a third lens emission surface located at a position different from the second lens emission surface, and some of the light entered from the second lens incidence surface is guided toward the third lens emission surface and then is emitted from the third lens emission surface, causing the second emission region, which is located at a position different from the second lens emission surface, to emit light.

(5) The vehicle lamp according to the above-mentioned (1), including a light blocking member located on a back surface side of the outer lens, wherein the light blocking member has an opening portion that opens to correspond to the first emission region.

As described above, according to the aspect of the present invention, there is provided a vehicle lamp capable of causing each of emission regions located at different positions of a front side and an outer circumferential edge portion of an outer lens to emit light using a single lighting unit disposed in a lighting body.

DETAILED DESCRIPTION OF THE INVENTION

Figure 1:
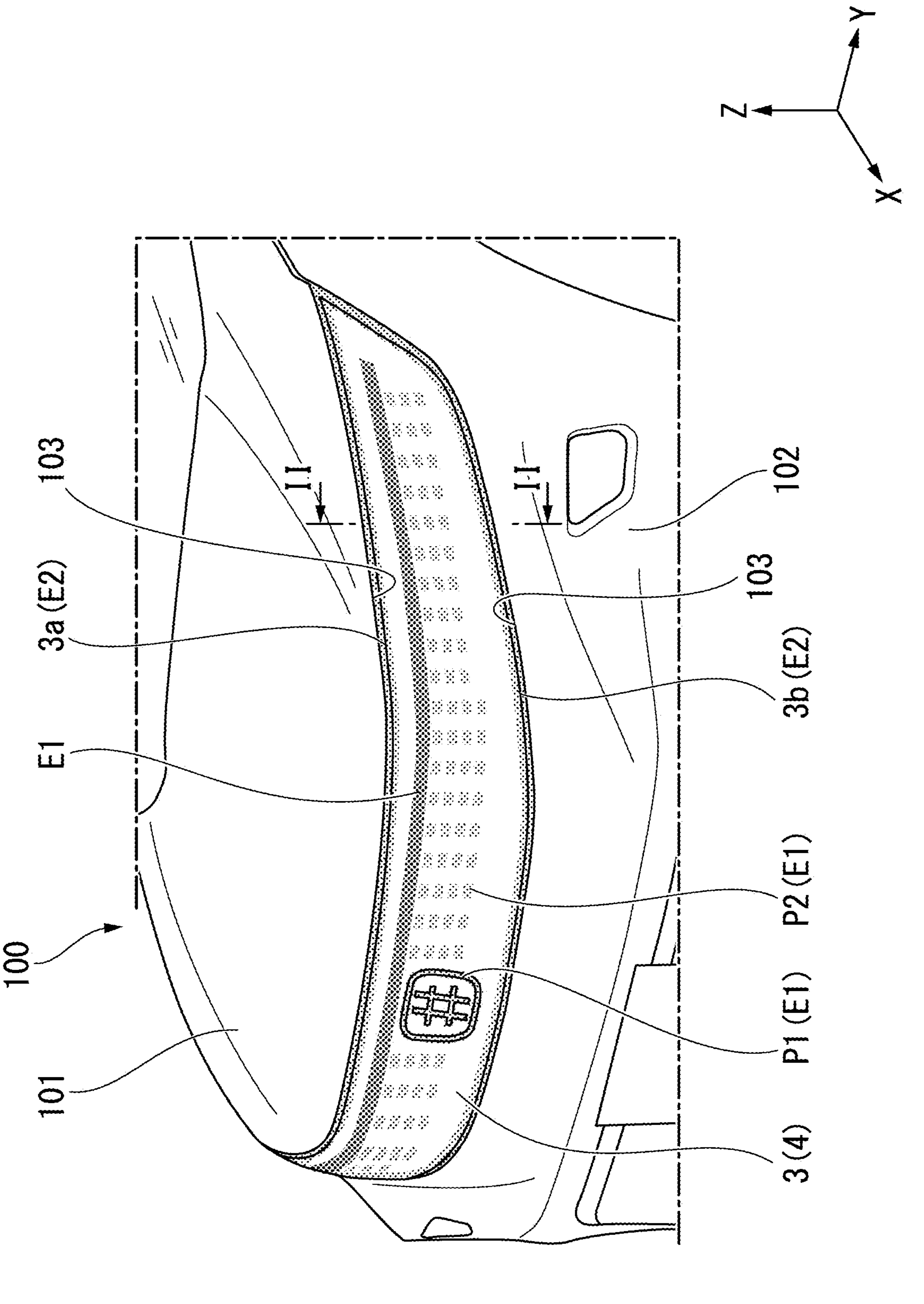
FIG. 1 is a perspective view of a vehicle including a vehicle lamp according to an embodiment of the present invention when seen from the front side.

Hereinafter, an embodiment of the present invention will be described in detail with reference to the accompanying drawings.

Further, in the drawings used in the following description, in order to make each component easier to see, dimensions of each component may be shown at different scales, and dimensional ratios of each component may not necessarily be the same as in reality.

Figure 2:
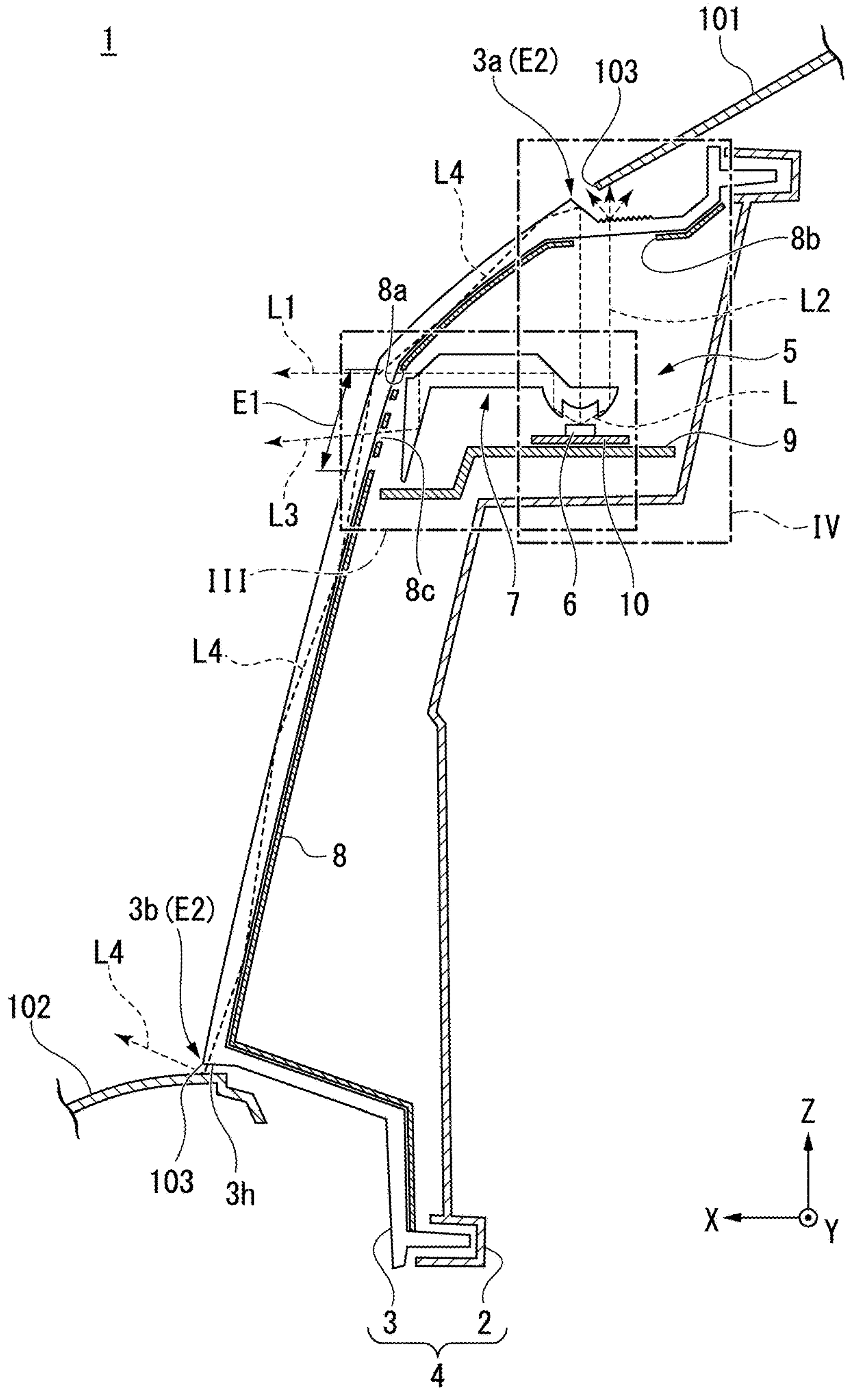
FIG. 2 is a cross-sectional view of the vehicle lamp along a line segment II-II shown in FIG. 1.
Figure 3:
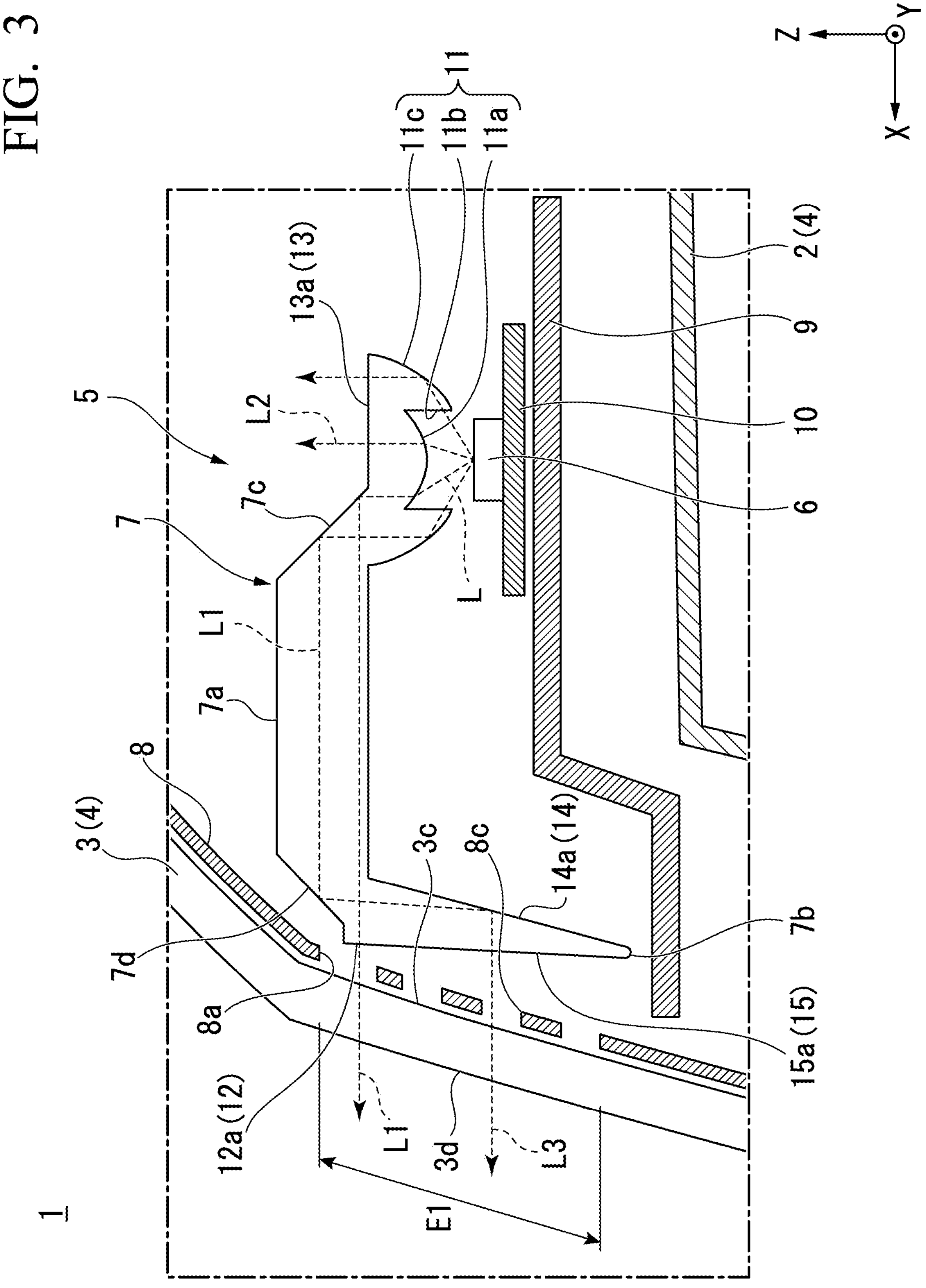
FIG. 3 is an enlarged cross-sectional view of an enclosed area III of the vehicle lamp shown in FIG. 2.
Figure 4:
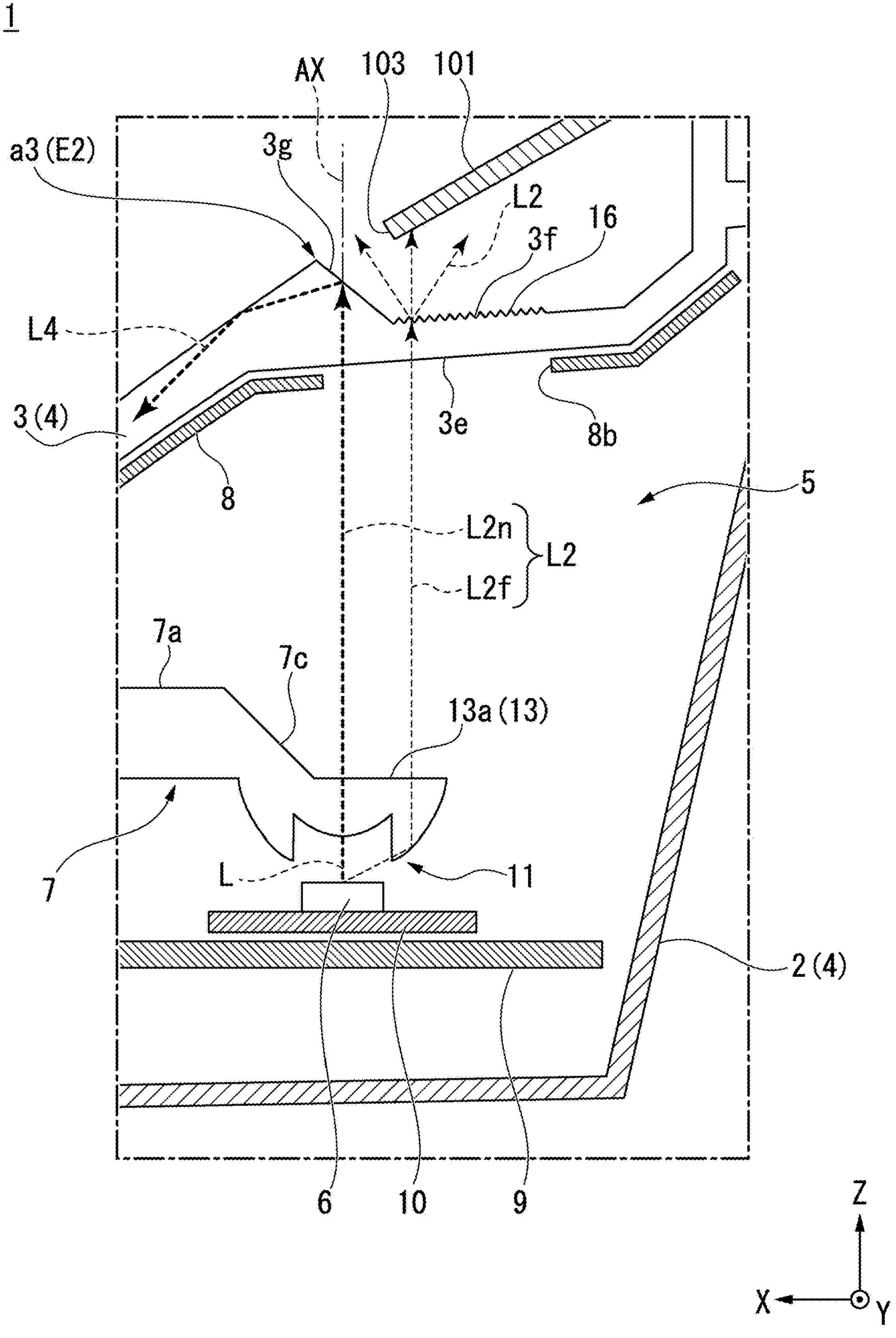
FIG. 4 is an enlarged cross-sectional view of an enclosed area IV of the vehicle lamp shown in FIG. 2.
Figure 5:
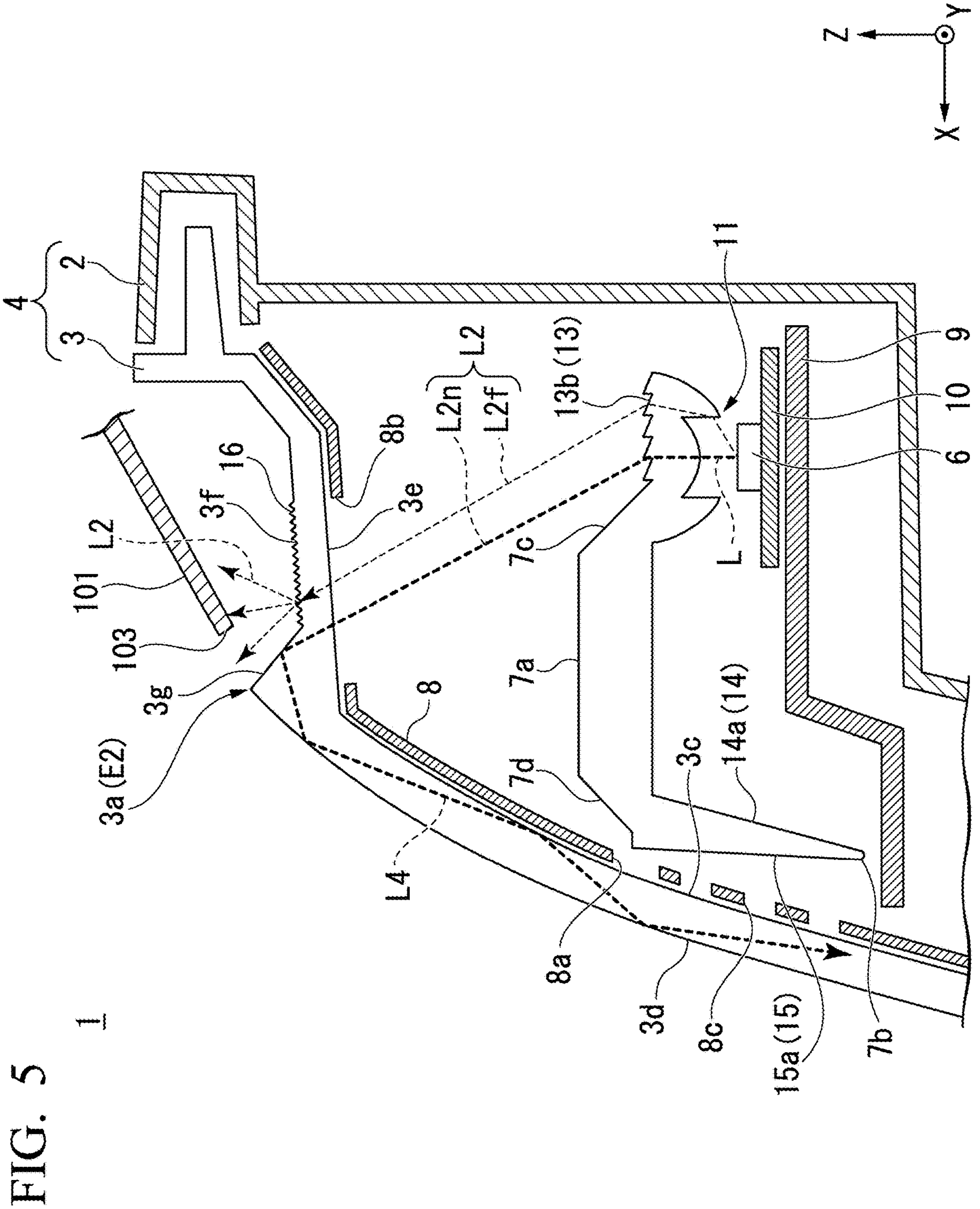
FIG. 5 is a cross-sectional view showing a variant of an inner lens.

As an embodiment of the present invention, for example, a vehicle lamp 1 shown in FIG. 1 to FIG. 5 will be described. Further, FIG. 1 is a perspective view of a vehicle 100 including the vehicle lamp 1 when seen from the front side. FIG. 2 is a cross-sectional view of the vehicle lamp 1 along a line segment II-II shown in FIG. 1. FIG. 3 is an enlarged cross-sectional view of an enclosed area III of the vehicle lamp 1 shown in FIG. 2. FIG. 4 is an enlarged cross-sectional view of an enclosed area IV of the vehicle lamp 1 shown in FIG. 2. FIG. 5 is a cross-sectional view showing a variant of an inner lens 7.

In addition, in the drawing as described below, an XYZ orthogonal coordinate system is set, an X-axis direction indicates a forward/rearward direction of the vehicle lamp 1, a Y-axis direction indicates a leftward/rightward direction of the vehicle lamp 1, and a Z-axis direction indicates an upward/downward direction of the vehicle lamp 1.

The vehicle lamp 1 of this embodiment, for example, as shown in FIG. 1, serves as a vehicle width indicator (position lamp) or a daytime running lamp (DRL) mounted on the front side of the vehicle 100, and emits white light from a line-shaped first emission region E1 extending in the vehicle width direction on the front side, and a line-shaped second emission region E2 surrounding the contour of the first emission region E1.

In addition, the first emission region E1 is located at a center portion of the front side, and is capable of emitting and displaying, for example, a display pattern P1, for example, a brand name such as a vehicle name or manufacturer name, or a logo mark, or decorative display patterns P2 on both sides of the display pattern P1.

As shown in FIG. 2 to FIG. 4, the vehicle lamp 1 of the embodiment has a structure in which a lighting unit 5 is disposed inside a lighting body 4 constituted by a housing 2 with a front surface open, and an outer lens 3 configured to cover the opening of the housing 2.

The lighting body 4 is disposed so that the outer lens 3 faces outward from an opening portion 103 provided between a bonnet 101 and a bumper 102 of the vehicle 100. Accordingly, an upper outer circumferential edge portion 3*a* and a lower outer circumferential edge portion 3*b* of the outer lens 3 are located along the periphery of the opening portion 103 between the bonnet 101 and the bumper 102. Further, the shape of the lighting body 4 can be changed as appropriate to match the design or the like of the vehicle 100.

The lighting unit 5 includes a light source 6 configured to emit white light (hereinafter, simply referred to as light) L, and the inner lens 7 configured to guide the light L emitted from the light source 6.

In addition, an extension 8 configured to cover the front side of the lighting unit 5 is disposed inside the lighting body 4 along a back surface side of the outer lens 3. Further, a bracket 9 configured to attach the above-mentioned parts to an inner side of the lighting body 4, or the like, is disposed inside the lighting body 4.

The light source 6 is constituted by a light emitting element, such as a light emitting diode (LED) that emits white light, and is mounted on one side of a circuit board 10 on which a driving circuit that drives the light emitting element is also provided. The circuit board 10 is attached on the surface of the bracket 9. Accordingly, the light source 6 radially emits the light L in a direction perpendicular to one surface of the circuit board 10 (upward in this embodiment).

The inner lens 7 is constituted by a light guide body, for example, a transparent resin such as polycarbonate, acryl, or the like, or glass, and has a curved plate shape including a first light guide part 7*a* extending forward from a base end side facing the light source 6 and a second light guide part 7*b* with a tip side extending downward. In addition, the second light guide part 7*b* has a shape in which the back surface side is inclined toward the front side so that the thickness gradually decreases toward the tip side. Further, the inner lens 7 has a first inclined reflective surface 7*c* on a base end side of the first light guide part 7*a*, and a second inclined reflective surface 7*d* between the first light guide part 7*a* and the second light guide part 7*b*.

The inner lens 7 has an incidence part 11 located at a position facing the light source 6 on a base end side of the first light guide part 7*a*, a first emission part 12 located at a position facing the front side of the outer lens 3 on a tip side of the first light guide part 7*a*, a second emission part 13 located at a position facing the upper outer circumferential edge portion 3*a* of the outer lens 3 on a base end side of the first light guide part 7*a*, a reflection part 14 located on a back surface side of the second light guide part 7*b*, and a third emission part 15 located on the front side of the second light guide part 7*b*.

The incidence part 11 has a lens shape that collects the light L radially emitted from the light source 6 toward the optical axis and causes the light to enter the inside of the first light guide part 7*a*.

Specifically, the incidence part 11 has a first condensing incidence surface 11*a* that is located at a center of a portion facing the light source 6 and into which some of the light L emitted from the light source 6 enters, a second condensing incidence surface 11*b* that is located on an inner circumferential side of a protrusion protruding from a position surrounding the first condensing incidence surface 11*a* toward the light source 6 and into which some of the light L emitted from the light source 6 enters, and a condensing reflective surface 11*c* that is located on an outer circumferential side of the protrusion and that is configured to reflect the light L entering from the second condensing incidence surface 11*b*.

In the incidence part 11, among the light L radially emitted from the light source 6, the light L entering the first light guide part 7*a* through the first condensing incidence surface 11*a* is condensed toward the optical axis. Meanwhile, the light L entering the inside of the first light guide part 7*a* through the second condensing incidence surface 11*b* is reflected by the condensing reflective surface 11*c*, and is thereby condensed toward the optical axis. Accordingly, the light L emitted radially from the light source 6 is focused toward the optical axis or parallelized (collimated) and enters the inside of the first light guide part 7*a*.

In addition, the light L entering through the incidence part 11 is guided inside the first light guide part 7*a* toward the second emission part 13 and the first inclined reflective surface 7*c* located above. Further, the light L entered the first inclined reflective surface 7*c* is reflected toward the first emission part 12 and the second inclined reflective surface 7*d*, which are located in front of the first light guide part 7*a*. Then, the light L entered the second inclined reflective surface 7*d* is reflected toward the second light guide part 7*b*, and then guided inside the second light guide part 7*b* toward the tip side.

The first emission part 12 has a flat (planar) first emission surface 12*a* at a position adjacent to the second inclined reflective surface 7*d*. In the first emission part 12, some of the light L (hereinafter referred to as "first light L1") guided forward inside the first light guide part 7*a* is emitted from the first emission surface 12*a* to the outside of the second light guide part 7*b*. Accordingly, the first light L1 emitted from the first emission surface 12*a* is radiated toward the front side of the outer lens 3.

The second emission part 13 has a flat (planar) second emission surface 13*a* at a position adjacent to the first inclined reflective surface 7*c*. In the second emission part 13, some of the light L (hereinafter referred to as "second light L2") guided upward inside the first light guide part 7*a* is emitted from the second emission surface 13*a* to the outside of the first light guide part 7*a*. Accordingly, the second light L2 emitted from the second emission surface 13*a* is radiated toward the upper outer circumferential edge portion 3*a* of the outer lens 3.

The reflection part 14 has a plurality of reflection cuts 14*a* inside a contour of a shape corresponding to the above-mentioned the display patterns P1 and P2 (in FIG. 2, the display pattern P2). The plurality of reflection cuts 14*a* need only reflect the light L (hereinafter referred to as "third light L3") entering the back surface side of the second light guide part 7*b* at an angle at which it is emitted (transmitted) to the outside from the front side of the second light guide part 7*b*, and there are no particular limitations on their shape, size, number, etc. For example, in the embodiment, the plurality of reflection cuts 14*a* are constituted by prism cuts having a substantially triangular cross section arranged on a surface having a shape corresponding to each of the display patterns P1 and P2.

The third emission part 15 has a flat (planar) third emission surface 15*a* constituted by the front of the second light guide part 7*b*. In the third emission part 15, the third light L3 reflected by the plurality of reflection cuts 14*a* is emitted from the third emission surface 15*a* to the outside of the second light guide part 7*b*. Accordingly, the third light L3 emitted from the third emission surface 15*a* is radiated toward the front side of the outer lens 3.

The extension 8 covers surroundings of the front side of the lighting unit 5, blocking light leakage from the lighting unit 5. In addition, the extension 8 also plays a role in the design of the vehicle lamp 1.

The extension 8 is constituted by a colored (for example, black or silver) light blocking member, and has a first opening portion 8*a* that opens in a line in the vehicle width direction at a position facing the first emission surface 12*a*, a second opening portion 8*b* that opens at a position facing the first emission surface 12*a*, and a third opening portion 8*c* that opens in a shape corresponding to the display patterns P1 and P2 at a position facing the third emission surface 15*a*.

Further, the extension 8 is not necessarily required and can be omitted. In addition, instead of the extension 8, a light blocking member such as a bezel or a light blocking layer may be disposed on the back surface side of the outer lens 3.

The outer lens 3 has a first lens incidence surface 3*c* located on a side facing the first emission surface 12*a* and the third emission surface 15*a*, a first lens emission surface 3*d* located on a side opposite to the first lens incidence surface 3*c*, a second lens incidence surface 3*e* located on a side facing the second emission surface 13*a*, a second lens emission surface 3*f* and a third inclined reflective surface 3*g* that are located on a side opposite to the second lens incidence surface 3*e*, and a third lens emission surface 3*h* located on the lower outer circumferential edge portion 3*b*.

In addition, a diffusion part 16 configured to diffuse the second light L2 emitted from the second lens emission surface 3*f* is provided on the second lens emission surface 3*f*. Examples of the diffusion part 16 include lens cuts called flute cuts and fisheye cuts, and concavo-convex structures formed by knurling, embossing, etc. In addition, by adjusting the shape of the diffusion part 16, it is possible to control the diffusion degree of the second light L2 emitted from the second lens emission surface 3*f*.

In the outer lens 3, the first light L1 and the third light L3 emitted from the first emission surface 12*a* and the third emission surface 15*a* enter the first lens incidence surface 3*c*, and then, are emitted from the first lens emission surface 3*d*. Accordingly, on the front side of the outer lens 3, the first light L1 can cause the first emission region E1 to emit white light in a line shape, and the third light L3 can cause the display patterns P1 and P2 to emit white light.

In addition, in the outer lens 3, the second light L2 emitted from the second emission surface 13*a* enters through the second lens incidence surface 3*e*, and then, is emitted from the second lens emission surface 3*f*. Accordingly, in the upper outer circumferential edge portion 3*a* of the outer lens 3, the second light L2 is emitted from the gap between the upper outer circumferential edge portion 3*a* and the opening portion 103 of the bonnet 101, making it possible to cause the upper outer circumferential edge portion 3*a* of the outer lens 3, which constitutes the second emission region E2, to emit white light in a line shape.

Meanwhile, some of the second light L2 entering through the second lens incidence surface 3*e* (hereinafter referred to as "fourth light L4") is reflected by the third inclined reflective surface 3*g*, guided toward the third lens emission surface 3*h*, and then, emitted from the third lens emission surface 3*h*.

Accordingly, in the lower outer circumferential edge portion 3*b* of the outer lens 3, the fourth light LA is emitted from the gap between the lower outer circumferential edge portion 3*b* and the opening portion 103 of the bumper 102, making it possible to cause the lower outer circumferential edge portion 3*b* of the outer lens 3, which constitutes the second emission region E2, to emit white light in a line shape.

In addition, in the vehicle lamp 1 of the embodiment, as shown in FIG. 4, a light component L2*n* of the light L emitted from the light source 6, which is closer to an optical axis AX, is located closer to the third inclined reflective surface 3*g* than a light component L2*f*, which is farther from the optical axis AX, so that a proportion (light quantity) of the fourth light LA reflected by the third inclined reflective surface 3*g* among the second light L2 entered the above mentioned second lens incidence surface 3*e* is greater than a proportion (light quantity) of the second light L2 emitted from the second lens emission surface 3*f*.

In this case, the light component L2*n* closer to the optical axis AX has a higher luminous intensity than the light component L2*f* farther from the optical axis AX, and after being reflected by the third inclined reflective surface 3*g*, the light component L2*n* (the fourth light LA) closer to the optical axis AX is attenuated during guided toward the third lens emission surface 3*h*, and then, is emitted from the third lens emission surface 3*h*.

Accordingly, by adjusting the light quantity of the second light L2 emitted from the second lens emission surface 3*f* and the light quantity of the fourth light L4 emitted from the third lens emission surface 3*h*, it is possible to cause the upper outer circumferential edge portion 3*a* and the lower outer circumferential edge portion 3*b* of the outer lens 3 that constitutes the second emission region E2 to emit light more uniformly.

Further, in the vehicle lamp 1 of the embodiment, a plurality of configurations shown in FIG. 2 above are arranged side by side in the longitudinal direction of the lighting body 4 (the widthwise direction of the vehicle 100). That is, the plurality of light sources 6 are arranged side by side in the longitudinal direction of the lighting body 4 (the widthwise direction of the vehicle 100). In addition, the inner lens 7 extends in the longitudinal direction of the lighting body 4 (the widthwise direction of the vehicle 100), and is configured so that the incidence part 11 is provided for each part that faces the plurality of light sources 6. Accordingly, it is possible to cause the first emission region E1 and the second emission region E2 to emit white light across the widthwise direction of the outer lens 3.

In addition, as shown in FIG. 1, by adjusting the proportion (light quantity) of the fourth light LA reflected by the third inclined reflective surface 3*g* described above in accordance with the difference in distance between the upper outer circumferential edge portion 3*a* and the lower outer circumferential edge portion 3*b* of the outer lens 3, it is possible to cause the upper outer circumferential edge portion 3*a* and the lower outer circumferential edge portion 3*b* of the outer lens 3, which constitute the second emission region E2, to emit light more uniformly across the widthwise direction of the outer lens 3.

In addition, for the outer circumferential edge portions located on both the left and right sides of the outer lens 3, the above-mentioned third lens emission surface 3*h* is provided, and the fourth light LA is emitted from this third lens emission surface 3*h*, making it possible to emit white light in a line as the above-mentioned second emission region E2.

In addition, the diffusion part 16 may be provided on the third lens emission surface 3*h* so as to diffuse the fourth light LA emitted from the third lens emission surface 3*h*.

As described above, in the vehicle lamp 1 of the embodiment, by directing some of the light L irradiated by the lighting unit 5 described above (the first and third lights L1 and L3) toward the front side of the outer lens 3, the first emission region E1 can be made to emit light, and by directing some of the light L irradiated by the lighting unit 5 (the second and fourth lights L2 and LA) toward the outer circumferential edge portions 3*a* and 3*b* of the outer lens 3, the second emission region E2 can be made to emit light.

In the vehicle lamp 1 of the embodiment, by using one of the lighting units 5 arranged in the lighting body 4 described above to emit light in the first emission region E1 and the second emission region E2, which are located at different positions on the front side of the outer lens 3 and the outer circumferential edge portions 3*a* and 3*b*, it is possible to achieve light emission that is excellent in design and functionality. In addition, it is possible to simplify the structure and keep manufacturing costs lower than when the first emission region E1 and the second emission region E2 are constituted by separate lighting units.

Further, the present invention is not necessarily limited to the above-mentioned embodiment, and various modifications can be made without departing from the scope of the present invention.

For example, as in the inner lens 7 shown in FIG. 5, in the second emission part 13, instead of the second emission surface 13*a*, a plurality of light distribution cuts 13*b* that control the light distribution of the second light L2 emitted toward the second lens incidence surface 3*e* may be provided.

Accordingly, it is possible to adjust the proportion (light quantity) of the fourth light LA that is reflected by the third inclined reflective surface 3*g* and the proportion (light quantity) of the second light L2 that is emitted from the second lens emission surface 3*f*, among the second light L2 entering the second lens incidence surface 3*e*. In addition, this type of adjustment can also be achieved by adjusting the shape of the second lens incidence surface 3*e*.

Further, the light source 6 is not limited to one consisting of one light emitting element, but may be one constituted by a plurality of light emitting elements. In addition, the light source 6 is not limited to one that emits white light, but may also emit light of other colors. Further, the light source 6 may be configured to variably adjust the color tone of the light L using a plurality of light emitting elements of different colors.

For example, the light source 6 may be configured to include a light emitting element that emits white light and a light emitting element that emits orange light, and in addition to emitting white light from the first emission region E1 and the second emission region E2 as the above-mentioned vehicle width indicator (position lamp) or daytime running lamp (DRL), etc., it may also be configured to flash orange light on both sides in the widthwise direction of the first emission region E1 as a direction indicator (turn lamp). Further, sequential emission is also possible by sequentially lighting the plurality of light sources 6.

The lighting unit 5 is not necessarily limited to the configuration having the light source 6 and the inner lens 7 described above, but may be configured, for example, to use a reflector and illuminate the first emission region E1 and the second emission region E2, which are located at different positions on the front side of the outer lens 3 and the outer circumferential edge portions 3*a* and 3*b*, using light reflected by the reflector.

Further, in the embodiment, although the present invention has been applied to the vehicle lamp 1 mounted on the front side of the vehicle 100 described above as an example, it is also possible to apply the present invention to a vehicle lamp mounted on the rear side of a vehicle.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle lamp having a lighting unit disposed inside a lighting body constituted by a housing having an opening in a front surface side of the housing, and an outer lens configured to cover the opening of the housing, wherein the lighting unit includes a light source, and a light guide body configured to guide the light emitted from the light source, the light guide body includes a first light guide part in which a base end of the first light guide part faces the light source and the first light guide part extends from the base end of the first light guide part toward a front side of the outer lens, wherein the first light guide part includes:

an incidence part that faces the light source at the base end of the first light guide part and into which the light emitted from the light source enters;

a first inclined reflective surface formed at the base end of the first light guide part which is opposite to a side in which the incidence part is located, a first emission part that is provided at a tip of the first light guide part located at an opposite side, of the first light guide part, from the base end of the first light guide part and that is configured to emit the light toward the front side of the outer lens; and a second emission part that is located adjacent to the first inclined reflective surface at a position facing the incidence part in the base end of the first light guide part and at a position facing an outer circumferential edge portion of the outer lens, and that is configured to emit the light toward the outer circumferential edge portion of the outer lens, some of the light guided in the first light guide part from the incidence part is reflected at the first inclined reflective surface toward the first emission part and is emitted toward the front side of the outer lens from the first emission part to cause a first lens emission surface of the outer lens to emit light, and some of the light guided in the first light guide part from the incidence part is emitted toward the outer circumferential edge portion of the outer lens from the second emission part to cause a second lens emission surface of the outer lens to emit light.

2. The vehicle lamp according to claim 1, wherein the outer lens has:

a first lens incidence surface that is located on a side facing the first emission part and into which the light emitted from the first emission part enters;

the first lens emission surface that is located on a side opposite to the first lens incidence surface and that is configured to emit the light entering from the first lens incidence surface;

a second lens incidence surface that is located on a side opposite to the second emission part and into which the light emitted from the second emission part enters; and the second lens emission surface that is located on a side opposite to the second lens incidence surface and that is configured to emit the light entering from the second lens incidence surface.

3. The vehicle lamp according to claim 2, wherein the outer lens further includes:

a second inclined reflective surface at which some of the light entered from the second lens incidence surface is reflected, and a third lens emission surface that is configured to emit the light, (i) which has been reflected at the second inclined reflective surface after entered from the second lens incidence surface and (ii) which has been guided inside of the outer lens, toward outside of the outer lens and that is provided at a position different from the second lens emission surface, and the outer circumferential edge portion of the outer lens, which is located at a position different from the second lens emission surface, is made to emit light by the light emitted from the third lens emission surface.

4. The vehicle lamp according to claim 1, comprising a light blocking member located on a back surface side of the outer lens, wherein the light blocking member has an opening portion that opens to correspond to a position where the first lens emission surface of the outer lens emits light.

5. The vehicle lamp according to claim 1, wherein the light guide body further includes:

a second light guide part that is provided at a tip of the first light guide part and that is extending in a direction different from a direction in which the first light guide part is extending, a third inclined reflective surface that is located at the tip of the first light guide part and that is adjacent to the first emission part, a reflection part formed at a back surface side of the second light guide part, and a third emission part formed at a front side of the second light guide part, the light entered the third inclined reflective surface is reflected toward the third light guide part and then being guided inside of the third light guide part toward a tip side of the third light guide part, reflected at the reflection part and emitted from the third emission part toward the front side of the outer lens and thereby makes the first lens emission surface of the outer lens to emit light.

* * * * *